United States Patent
Chando et al.

(10) Patent No.: US 11,738,864 B2
(45) Date of Patent: Aug. 29, 2023

(54) APPARATUS WITH VARIABLE PITCH AND CONTINUOUS TILT FOR ROTORS ON AN UNMANNED FIXED WING AIRCRAFT

(71) Applicants: Greg Chando, Huntsville, AL (US); Zachary Stein, Haiku, HI (US)

(72) Inventors: Greg Chando, Huntsville, AL (US); Zachary Stein, Haiku, HI (US)

(73) Assignee: IERUS Technologies, Huntsville, AL (US)

( * ) Notice: Subject to any disclaimer, the term of this patent is extended or adjusted under 35 U.S.C. 154(b) by 394 days.

(21) Appl. No.: 17/065,563

(22) Filed: Oct. 8, 2020

(65) Prior Publication Data

US 2022/0111959 A1    Apr. 14, 2022

(51) Int. Cl.

| | |
|---|---|
| *B64C 29/00* | (2006.01) |
| *B64C 39/02* | (2023.01) |
| *B64D 27/24* | (2006.01) |
| *B64C 27/605* | (2006.01) |
| *B64U 10/20* | (2023.01) |

(Continued)

(52) U.S. Cl.
CPC .......... *B64C 39/024* (2013.01); *B64C 27/28* (2013.01); *B64C 27/52* (2013.01); *B64C 27/605* (2013.01);
(Continued)

(58) Field of Classification Search
CPC ......... B64C 11/44; B64C 27/22; B64C 27/28; B64C 27/52; B64C 27/58; B64C 27/605; B64C 29/0033; B64U 30/297
See application file for complete search history.

(56) References Cited

U.S. PATENT DOCUMENTS

| | | | |
|---|---|---|---|
| 2,468,913 | A | 5/1949 | Avery |
| 7,249,732 | B2 | 7/2007 | Sanders, Jr. et al. |

(Continued)

FOREIGN PATENT DOCUMENTS

| | | | | |
|---|---|---|---|---|
| CN | 109018333 | A | * 12/2018 | ............ B64C 27/12 |
| CN | 110228587 | A | 9/2019 | |

(Continued)

OTHER PUBLICATIONS

Phys Org, "Aerial Vehicle Flying Freely with Independently Controlled Main Wings", Jan. 12, 2018; 3 pgs.

*Primary Examiner* — Christopher D Hutchens
*Assistant Examiner* — Michael A. Fabula
(74) *Attorney, Agent, or Firm* — Lanier Ford Shaver & Payne, PC; Gerakd M. Walsh (57) ABSTRACT

An apparatus providing continuous tilt and variable pitch for rotors on a fixed wing VTOL aircraft. An actuator on a housing rotates a first pivot point on a motor mount to tilt a motor to horizontal and vertical positions. Simultaneously, an actuator on the motor mount rotates a fork on a second pivot point on the motor mount to adjust the pitch of the rotors attached to a free end of the motor's drive shaft. A lower swash plate on the drive shaft is attached to the fork. An upper swash plate on the drive shaft is attached to the rotors. The swash plates are attached to each other with a shaft bushing attached to a shaft ball bearing. The shaft bushing allows both swash plates to move linearly along the shaft when the fork is rotated. The shaft ball bearing allows the upper swash plate to rotate with the drive shaft while the lower swash plate remains stationary.

19 Claims, 6 Drawing Sheets

(51) Int. Cl.
  *B64C 27/52* (2006.01)
  *B64C 27/28* (2006.01)
  *B64U 30/297* (2023.01)
  *B64U 30/10* (2023.01)
  *B64U 30/20* (2023.01)
  *B64U 50/19* (2023.01)

(52) U.S. Cl.
  CPC .......... *B64C 29/0033* (2013.01); *B64D 27/24* (2013.01); *B64U 10/20* (2023.01); *B64U 30/297* (2023.01); *B64U 30/10* (2023.01); *B64U 30/20* (2023.01); *B64U 50/19* (2023.01)

(56) References Cited

U.S. PATENT DOCUMENTS

| | | | |
|---|---|---|---|
| 9,108,728 B2 | 8/2015 | Shaw | |
| 9,493,235 B2 | 11/2016 | Zhou et al. | |
| 10,144,509 B2 | 12/2018 | Cruz Ayoroa | |
| 10,538,321 B2 | 1/2020 | North et al. | |
| 10,589,867 B2 | 3/2020 | Lukaczyk et al. | |
| 11,117,657 B2 * | 9/2021 | Burns | B64C 39/08 |
| 2015/0246725 A1 | 9/2015 | Reilly | |
| 2017/0144771 A1 * | 5/2017 | Lukaczyk | B64C 29/0033 |
| 2017/0158320 A1 | 6/2017 | Bosch | |
| 2017/0203839 A1 | 7/2017 | Giannini et al. | |
| 2019/0071174 A1 | 3/2019 | Burigo et al. | |
| 2019/0193835 A1 * | 6/2019 | Sandberg | B64C 11/44 |
| 2019/0225332 A1 * | 7/2019 | Burns | B64C 39/024 |
| 2019/0263516 A1 | 8/2019 | McCullough et al. | |
| 2021/0331794 A1 * | 10/2021 | Burns | B64C 25/40 |
| 2021/0403161 A1 * | 12/2021 | Burns | B64D 31/00 |

FOREIGN PATENT DOCUMENTS

| | | | | |
|---|---|---|---|---|
| KR | 20130077242 A | * | 7/2013 | B64C 27/28 |
| KR | 101849246 B1 | * | 4/2018 | B64C 11/00 |

* cited by examiner

APPARATUS WITH VARIABLE PITCH AND CONTINUOUS TILT FOR ROTORS ON AN UNMANNED FIXED WING AIRCRAFT

FIELD OF THE INVENTION

This invention relates to vertical takeoff and landing (VTOL) unmanned aircraft vehicles (UAV) and, more particularly, to a variable pitch and continuous tilt apparatus that provides simultaneous rotor pitch and rotor tilt adjustments for horizontal and vertical flight of a fixed wing VTOL aircraft.

BACKGROUND OF THE INVENTION

Rotary wing UAVs offer the ability to hover and take-off and land vertically (VTOL) but are known to have less efficiency and speed than the fixed wing UAVs. Fixed wing UAVs have been used widely because of their simple design, high endurance, high range and high-speed capability, but these are incapable of VTOL. Fixed wing aircraft are faster and more fuel efficient than rotary winged aircraft, while rotary winged aircraft can hover and do not require long runways for takeoff and landing. Many potential missions make aircraft combining these features desirable. However, current aircraft configurations that are capable of vertical takeoff and transitioning to horizontal flight usually result in significant compromises in the performance of the aircraft in both the VTOL and horizontal flight modes because of the competing requirements of VTOL and efficient forward flight capabilities.

The current market for fixed wing UAVs is known to have only fixed pitch rotors. The use of variable pitch rotors instead of fixed pitched rotors in a fixed wing UAV would offer several advantages such as higher control authority and control bandwidth than fixed pitch rotors, due to higher rate of change of thrust and ability to generate negative thrust. Higher control authority would improve maneuverability and gust rejection capability and facilitate easier transition between different flight modes. Variable pitch rotors might enable the use of fuel engines and the use of different rotor RPMs during hover and forward flight modes to optimize rotor power consumption. A fixed wing VTOL UAV with variable pitch rotors is described by Chipade, Vishnu S. et al (Mechatronics 55 (2018) 94-114). However, the rotors cannot tilt so the entire aircraft must tilt for forward flight. In addition, a transmission between the rotor and motor is required.

What is needed is a VTOL UAV fixed wing aircraft executing hovering flight, horizontal forward flight, and transitioning between the two, in a stable and efficient manner with a simple propulsion system that simultaneously provides continuous rotor tilt and variable rotor pitch.

SUMMARY OF THE INVENTION

The present invention is an apparatus providing continuous tilt variable pitch and for rotors on an aircraft, preferably a fixed wing aircraft. The apparatus has a housing with an interior and a motor mount with an interior, the motor mount being attached rotatably to the housing, in the interior of the housing, and a motor attached to the motor mount in the interior of the motor mount. The motor has a drive shaft with rotors at a free end of the drive shaft. A rotor tilt adjustment actuator is attached to the housing and is attached with motor tilt linkage to a first pivot point on the motor mount. The rotor tilt adjustment actuator and the motor tilt linkage are constructed to tilt the motor mount from a horizontal position to a vertical position and vice versa as the motor mount is rotated in the housing by the rotor tilt adjustment actuator and the motor tilt linkage pushing or pulling the first pivot point on the motor mount.

A rotor pitch adjustment actuator is attached to the motor mount and is attached with rotor pitch linkage to a first end of a rotor pitch adjustment fork. The rotor pitch adjustment fork is attached rotatably at a second opposite end to a second pivot point on the motor mount. The rotor pitch adjustment actuator adjusts the pitch of the rotors by rotating the rotor pitch adjustment fork on the second pivot point. Preferably, the second pivot point is a dual pivot linkage. Each rotor is attached to a rotor holder, each rotor holder is attached rotatably to a rotor head hub, and the rotor head hub is attached to the free end of the drive shaft.

A fork member is positioned at the opposite end of the rotor pitch adjustment fork. The fork member has a pair of spaced-apart tines with a first connecting member attached to each tine. Each first connecting member extends to the motor mount and attaches to a lower swashplate. The lower swash plate is attached slidably to the drive shaft with the drive shaft passing through an interior of the lower swash plate, thereby allowing linear motion of the lower swash plate along the draft shaft. An upper swash plate is attached rotatably to the lower swash plate with the drive shaft passing through an interior of the upper swash plate. A second connecting member is attached to each side of the upper swash plate. Each second connecting member extends to a respective rotor holder and is attached rotatably to a rotor head hub. The rotor head hub is attached to the free end of the drive shaft and each rotor is attached to a respective rotor holder.

The lower swash plate has a ball bearing positioned around the drive shaft and an outer wall of the ball bearing is attached to an inner wall of the interior of the lower swash plate near a front end of the lower swash plate. The lower swash plate has a thrust bearing positioned around the drive shaft behind the ball bearing. The thrust bearing is spaced apart from an interior wall of the lower swash plate. Preferably, a sleeve bushing passes through the ball bearing, is attached to an inner wall of the ball bearing, and is positioned rotatably around the drive shaft. The sleeve bushing is attached to the upper swash plate thereby connecting the upper swash plate rotatably to the lower swashplate. A front end of the sleeve bushing has a flange which is connected to a shelf in the interior of the upper swash plate.

There are several advantages of the apparatus of the present invention. The rotors of an unmanned fixed wing aircraft can be held at an optimized pitch to provide the highest efficiency flight in both forward flight and vertical takeoff and landing and hover and all flight regimes in between. The rotation of the propulsion system from a vertical takeoff, landing, and hover orientation to a forward flight orientation is permitted with a continuous rotor tilt mechanism. The continuous rotor tilt mechanism provides the optimum rotor pitch for multiple flight regimes, coupled with the ability to tilt the rotors to any desired angle between 0 degrees and 95 degrees.

A variable-pitch rotor mechanism allows for the pitch of the rotors to be adjusted while in flight to optimize efficiency and/or thrust of the propulsion system for a specific flight condition. This mechanism utilizes a linearly adjustable rotating assembly that is attached to the rotor holders using a linkage that is pinned on one end and allowed to rotate spherically around a drive shaft on an opposite end. The linearly adjustable rotating assembly permits the transmission of force from an actuator through a rotating interface to allow the upper part of the assembly to rotate with the rotors while the lower part of the assembly is held from rotating. The force needed to adjust the pitch of the rotors is imparted onto the non-rotating lower part of the assembly, that is then transmitted through the rotating interface to the upper part of the assembly, through the linkage, and then to the rotor holders and rotors.

A forked, lever-style linkage is used to impart force onto the lower part of the assembly which is transmitted onto the upper part of the assembly, allowing a purely linear translation of the entire linearly adjustable and rotatable assembly. The force imparted by the actuator is transmitted to the propeller rotors blade for any specific pitch angle within the range designed into the system.

A continuous tilt mechanism allows for the continuous tilt of forward flight propulsion motors, from a position optimized for the VTOL and/or hover of an aircraft, to a position optimized for forward flight of an aircraft. This continuous tilt mechanism allows the entire propulsion system, including the variable pitch rotor mechanism, to be rotated around an axis so that the thrust vector of the propulsion system may be oriented in whatever direction is optimal for any given flight conditions. The axis of rotation of the continuous tilt mechanism produces a thrust vector of the propulsion system to create a pitching moment that will force the continuous tilt mechanism to rotate into the forward flight orientation.

A mechanical stop in a housing for the continuous tilt mechanism is designed to allow the moment generated by the off-axis propulsion vector to hold the mechanism in the forward flight orientation without the assistance of an actuator. This mechanical stop also serves to relieve any load imparted on an actuator in the forward flight condition.

The variable pitch of the mechanism allows the aircraft to optimize rotor blade pitch for maximum efficiency in both the VTOL, hover, and forward flight operating regimes. The continuous tilt of the mechanism allows the aircraft to transition smoothly from VTOL and hover to forward flight, while providing adequate yaw control authority below the minimum maneuvering airspeed of the aircraft in forward flight.

The apparatus of the present invention removes the previous need of VTOL UAS to either have separate propulsion systems for VTOL, hover, and forward flight or a compromised propulsion system that is inherently less efficient in both forward flight and VTOL and hover. The continuous tilt and variable pitch mechanisms allow for the use of the same propulsion system for all flight regimes, thereby lowering comparable vehicle takeoff weight, overall system complexity, and potential aircraft failure modes, versus previously designed VTOL and fixed wing UAS.

Yaw control of a quad rotor style UAS is provided by differential torque of the rotors, meaning that yaw control authority directly correlates to excess thrust capability. A quad rotor style UAS will usually lose yaw control authority if hovering above 80% thrust capability. The yaw control authority of the present invention allows for an increase in gross takeoff weight of the aircraft in comparison to previously designed VTOL and fixed wing UAS. When tilting the propulsion system for yaw control authority, only 3%-5% of hover thrust is lost, meaning the aircraft can vertically take off and land/hover at 90% thrust capability.

DETAILED DESCRIPTION OF THE INVENTION

While the following description details the preferred embodiments of the present invention, it is to be understood that the invention is not limited in its application to the details of arrangement of the parts or steps of the methods illustrated in the accompanying figures, since the invention is capable of other embodiments and of being practiced in various ways.

There usually must be a compromise between the pitch of the rotors necessary to perform vertical takeoff and landing and the pitch necessary for efficient forward flight. Some designers of VTOL UAVs have developed tilt-rotor designs that have continuous tilt functionality, but without the ability to vary pitch in flight they must settle for rotors with pitch that is neither optimized for hover or for forward flight. This lack of optimization can lead to dangerous situations when landing an aircraft, due to the compromised function of the rotors, such as rotor stall due to an excessive rate of decreasing altitude. Other designers of fixed wing VTOL UAVs have previously used separate propulsion systems for the VTOL phases of operation and the forward flight phase. Separate propulsion systems result in a heavier and less optimized system than can be achieved by the continuous tile and variable pitch mechanisms of the present invention.

Figure 1:
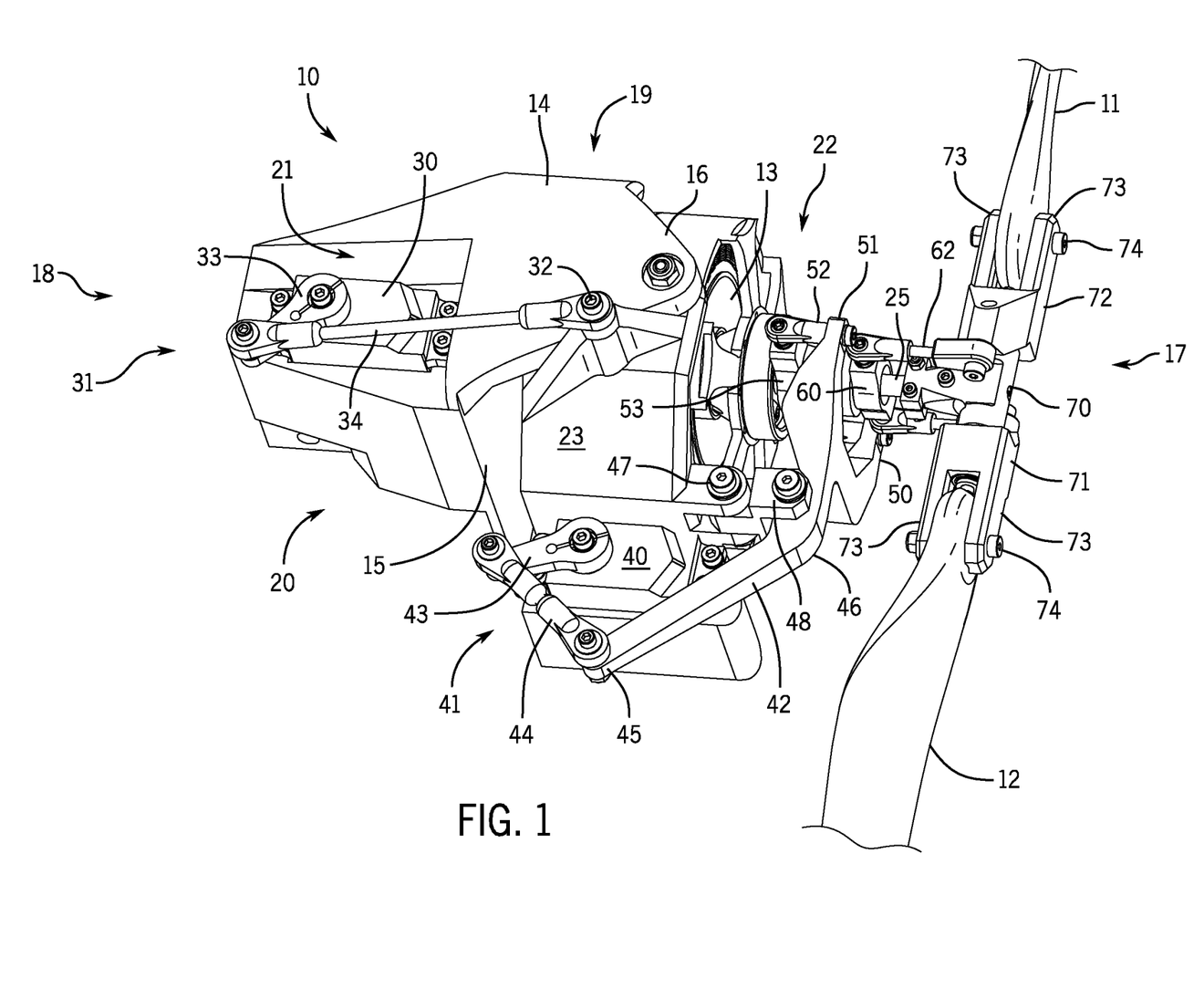
FIG. 1 shows a front, left, and bottom perspective view of the apparatus of the present invention for providing variable pitch and continuous tilt for rotors, while a motor and rotors are in a forward flight configuration.

FIG. 1 shows a front, left, and bottom perspective view of an apparatus 10 for providing variable pitch and continuous tilt for rotors 11 and 12, with a motor 13 and the rotors 11 and 12 in a forward flight configuration. Apparatus 10 has a housing 14 with an open interior 15 and a pair of motor mount support members 16. The housing has a front end 17, a rear end 18, a top 19, a bottom 20, a left side 21 and a right side 22. A motor mount 23 is attached rotatably to the motor mount support members 16 on the left side 21 and the right side 22 of the housing 14. The motor mount 23 has an open interior 24 (see FIG. 6). The motor 13 is attached to the motor mount 23 in the interior 24 of the motor mount 23. The motor has a drive shaft 25 with rotors 11 and 12 attached to a free end of the drive shaft 25.

A rotor tilt adjustment actuator 30 is attached to the housing 14 near the rear end 18, bottom 20, and left side 21 of the housing 14. The rotor tilt adjustment actuator 30 is connected with a motor title linkage 31 to a first pivot point 32 on the left side of the motor mount 23. The motor tilt linkage 31 comprises a servo drive arm 33 connected rotatably to a first end of a connecting rod 34. A second opposite end of the connecting rod 34 is connected rotatably the first pivot point 32 on a left side of the motor mount 23. The rotor tilt adjustment actuator 30 tilts the motor mount 23 from a horizontal position to a vertical position and vice versa as the motor mount 23 is rotated on the motor mount support members 16 by the rotor tilt adjustment actuator 30, pushing or pulling the first pivot point 32 on the motor mount 23.

A rotor pitch adjustment actuator 40 is attached to the motor mount 23 at the right side of the motor mount 23. The rotor pitch adjustment actuator 40 is connected with rotor pitch linkage 41 to a rotor pitch adjustment fork 42. The rotor pitch linkage 41 comprises a servo drive arm 43 connected rotatably to a first end of a connecting rod 44. A second opposite end of the connecting rod 44 is connected rotatably to a first end 45 of the rotor pitch adjustment fork 42. The rotor pitch adjustment fork 42 is attached rotatably at its second opposite end 46 to a second pivot point 47 on the motor mount 23. The rotor pitch adjustment actuator 40 adjusts the pitch of the rotors 11 and 12 by rotating the rotor pitch adjustment fork 42 on the second pivot point 47.

The second pivot point 47 may be connected to the second opposite end 46 of the rotor pitch adjustment fork 42 with a dual pivot linkage 48. The rotor pitch adjustment fork 42 then rotates on the dual pivot linkage 48 and the dual pivot linkage 48 rotates on the second pivot point 47.

A fork member 50 is attached to the rotor pitch adjustment fork 42 at the second opposite end 46. The fork member comprises a pair of spaced apart tines 51. A first connecting member 52 is attached to each tine 51 and each tine 51 extends towards the front of the motor mount 23 and attaches to a lower swash plate 53. The lower swash plate 53 is attached slideably to the drive shaft 25, with the drive shaft 25 passing through an interior 54 of the lower swash plate 53 (see FIG. 4).

An upper swash plate 60 is attached rotatably to the lower swash plate 53 with the drive shaft 25 passing through an interior 61 (see FIG. 4) of the lower swash plate 53. A second connecting member 62 is attached to each side of the upper swash plate 60. Each second connecting member 62 extends and connects to a respective rotor holders 71 and 72. The rotation of the rotor pitch adjustment fork 42 imparts a force on the first connecting members 52, causing the upper swash plate 60 to translate linearly along the drive shaft 25 due to the dual-pivot linkage 48. The dual-pivot linkage 48 is critical to the function of the variable pitch mechanism as without it, the movement of the fork member 50 would transcribe an arc and would not be able to move the swash plates 53 and 60 linearly along the drive shaft 25.

Each rotor holder 71 and 72 is attached rotatably to a rotor head hub 70. The rotor head hub 70 is attached to the free end of the drive shaft 25. Each rotor 11 and 12 is attached to a respective rotor holder 71 and 72. Each rotor holder 71 and 72 has spaced apart connecting members 73 which connect the rotors 11 and 12 to the respective rotor holders 71 and 72 with bolts 74.

Figure 2:
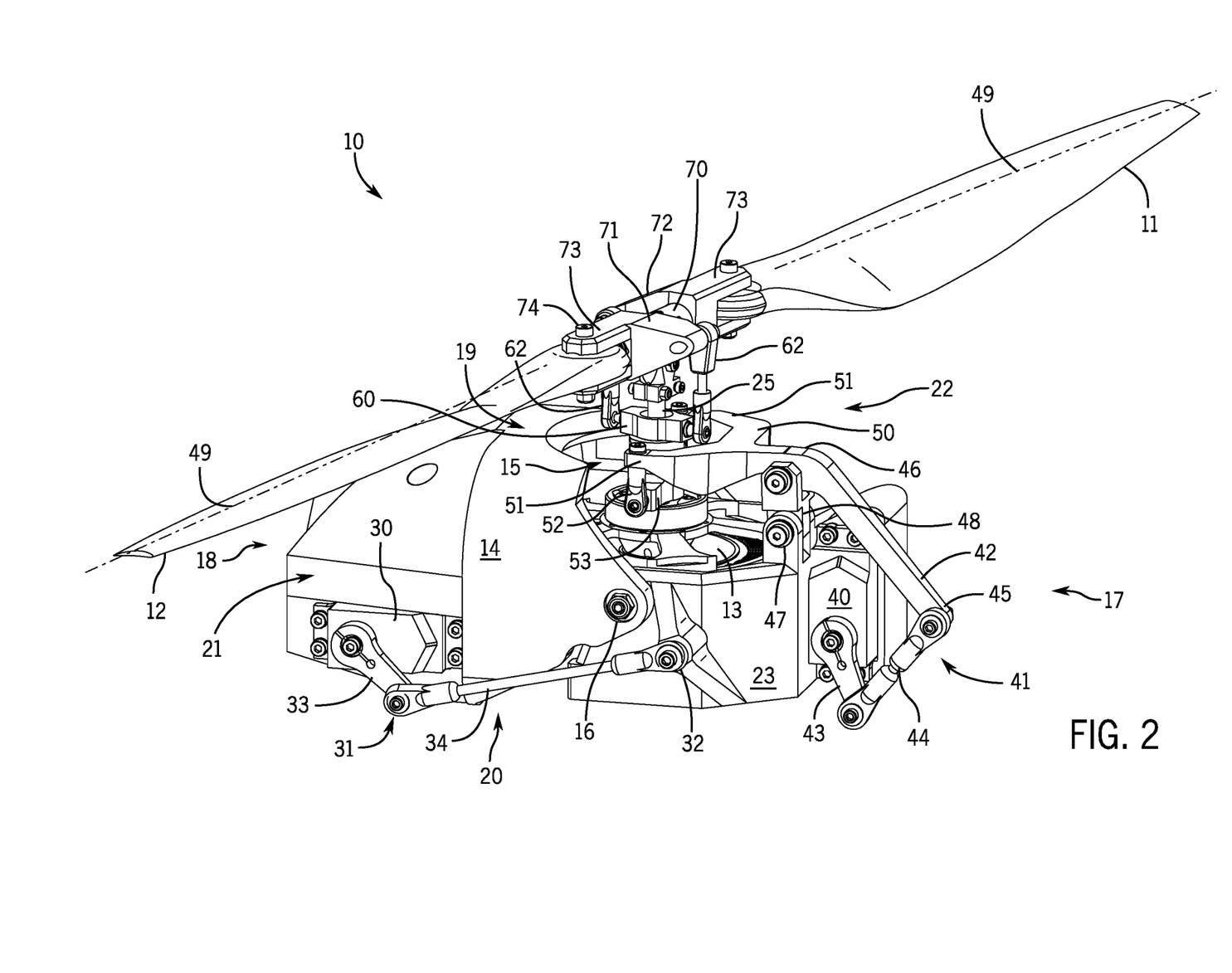
FIG. 2 shows a front, left, top perspective view of the apparatus, with the motor and the rotors in a configuration for hovering, take-off, and landing.

FIG. 2 shows a front, left, top perspective view of the apparatus 10, with the motor 13 and the rotors 11 and 12 in a configuration for hovering, take-off, and landing. The motor mount 23 is tilted upward by action of the rotor tilt adjustment actuator 30 which pushes the connecting rod 34 forward. Pushing the connecting rod 34 forward pushes the first pivot point 32 upwards, thereby rotating the motor mount 23, the motor 13, and the rotors 11 and 12 upward. The motor mount 13 is titled downward by the rotor tilt adjustment actuator 30 pulling the first pivot point 32 downward, placing the motor 13 and rotors 11 and 12 in an orientation for forward flight.

Figure 3:
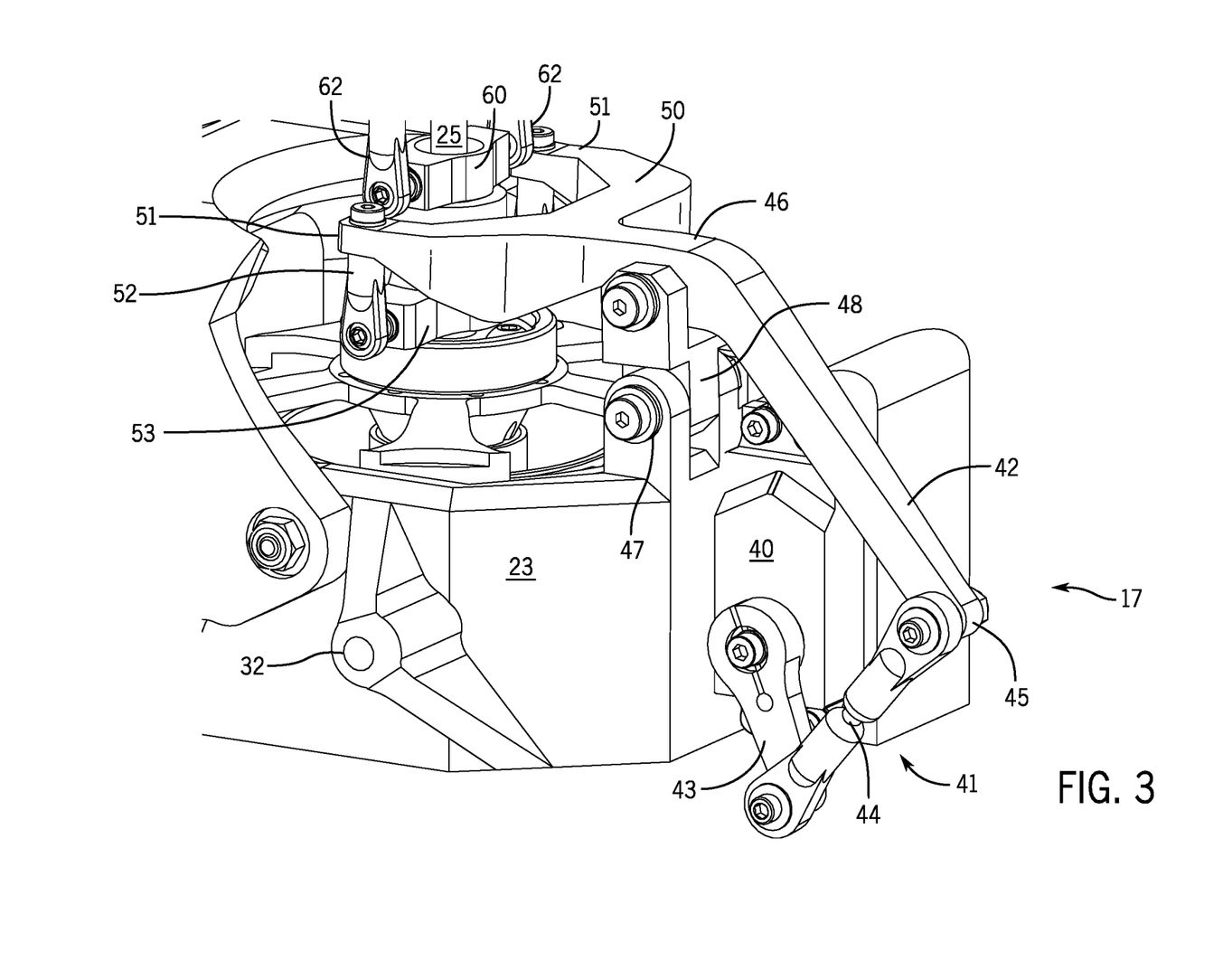
FIG. 3 is an enlarged front, left, and top perspective view of a rotor pitch adjustment fork, a fork member, a lower swash plate, and an upper swash plate.

FIG. 3 is an enlarged view of the rotor pitch adjustment fork 42, the fork member 50, the lower swash plate 53, and the upper swash plate 53, as shown in FIG. 2.

Figure 4:
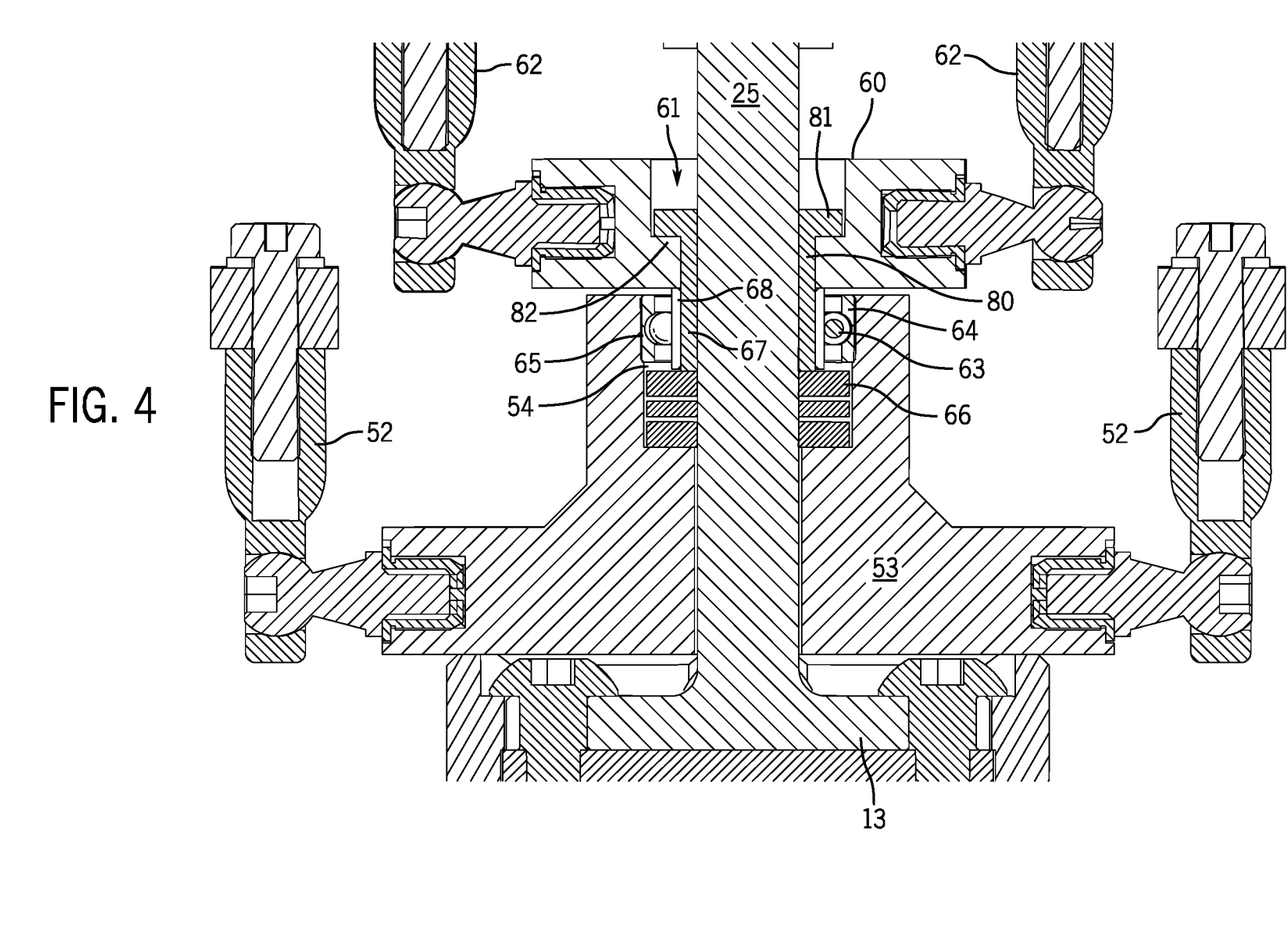
FIG. 4 is a sectional view through the center of the lower swash plate, the upper swash plate, and a drive shaft of the motor.

FIG. 4 is a sectional view through the center of the lower swash plate 53, the upper swash plate 60, and the drive shaft 25. FIG. 4 illustrates the features that connect the lower swash plate 53 to the upper swash plate 60, allow the upper swash plate 60 to rotate with the drive shaft 25 while the lower swash plate 53 does not rotate with the drive shaft 25, and allows the lower swash plate 53 and the upper swash plate 60 to slide towards and away from the rotor holders 71 and 72.

The lower swash plate 53 has a ball bearing 63 positioned around the drive shaft 25. An outer wall 64 of the ball bearing 63 is attached to an inner wall 65 of the interior 54 of the lower swash plate 53, near a front end of the lower swash plate 53. The lower swash plate 53 has a thrust bearing 66 positioned slidably around the drive shaft 25 behind the ball bearing 63. The thrust bearing 66 is spaced apart from the inner wall 65 of the lower swash plate. A sleeve bushing 67 is inserted through the ball bearing 63 and is attached to an inner wall 68 of the ball bearing 63. The sleeve busing 67 is positioned slidably around the drive shaft 25 and is attached to the upper swash plate 60, thereby connecting the upper swash plate 60 rotatably to the lower swash plate 53. Preferably, a front end 80 of the sleeve busing 67 has a flange 81 which is connected to a shelf 82 in the interior 61 of the upper swash plate 60 and the sleeve bushing 67 is press fit into both the upper swash plate 60 and the ball bearing 63. The thrust bearing 66 provides the transfer of axial loads from the ball bearing 63 to the face of the lower swash plate 53 against which the thrust bearing 66 is seated. The thrust bearing 66 is fitted into the lower swash plate 53 with a loose fit, so that the outer diameter of the thrust bearing 66 does not rub the inner wall 65 of the lower swash plate 53. The ball bearing 63 prevents the movement of the thrust bearing 66 against which the ball bearing 63 is seated. This assembly of the lower swash plate 53 and the upper swash plate 60 allows the free rotation of the upper swash plate 60 with respect to the lower swash plate 53 and allows the loads imparted onto the upper swash plate 60 to be freely transferred to the lower swash plate 53 during high speed rotation of the drive shaft 25. The upper swash plate rotation is driven by the rotation of the rotor head hub 70. The rotation is transferred through the rotor holders 71 and 72 and the connecting members 62 to the upper swash plate 60.

Figure 5:
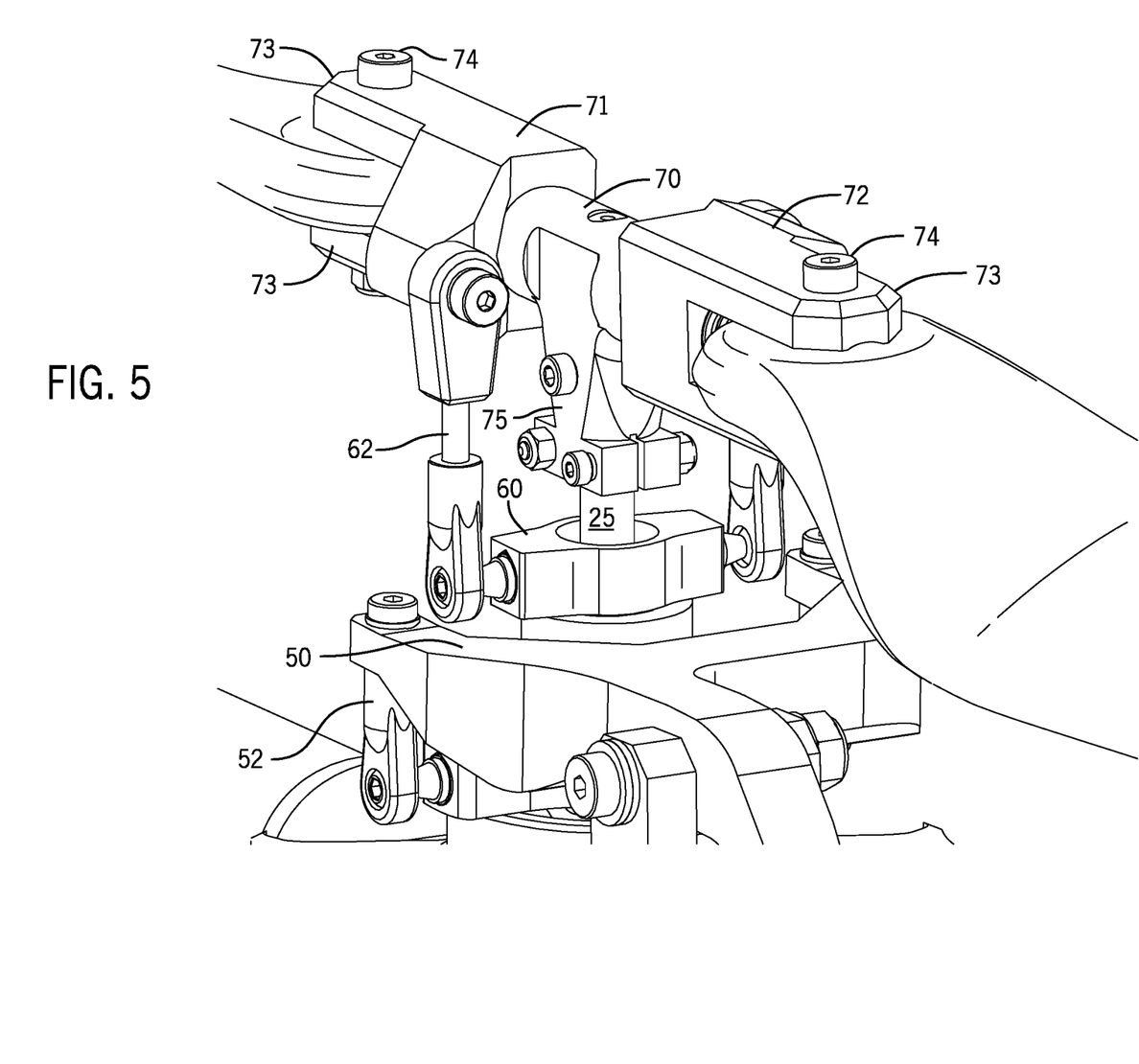
FIG. 5 is an enlarged front, left, and top perspective view of a rotor head hub, rotor holders, connecting members, and the upper swash plate.

FIG. 5 is an enlarged perspective view of the rotor head hub 70, the rotor holders 71 and 72, the connecting members 62, and the upper swash plate 60. FIG. 5 further shows that the rotor head hub 70 can be attached to the free end of the drive shaft 25 of the motor 13 with a clamp member 75.

Figure 6:
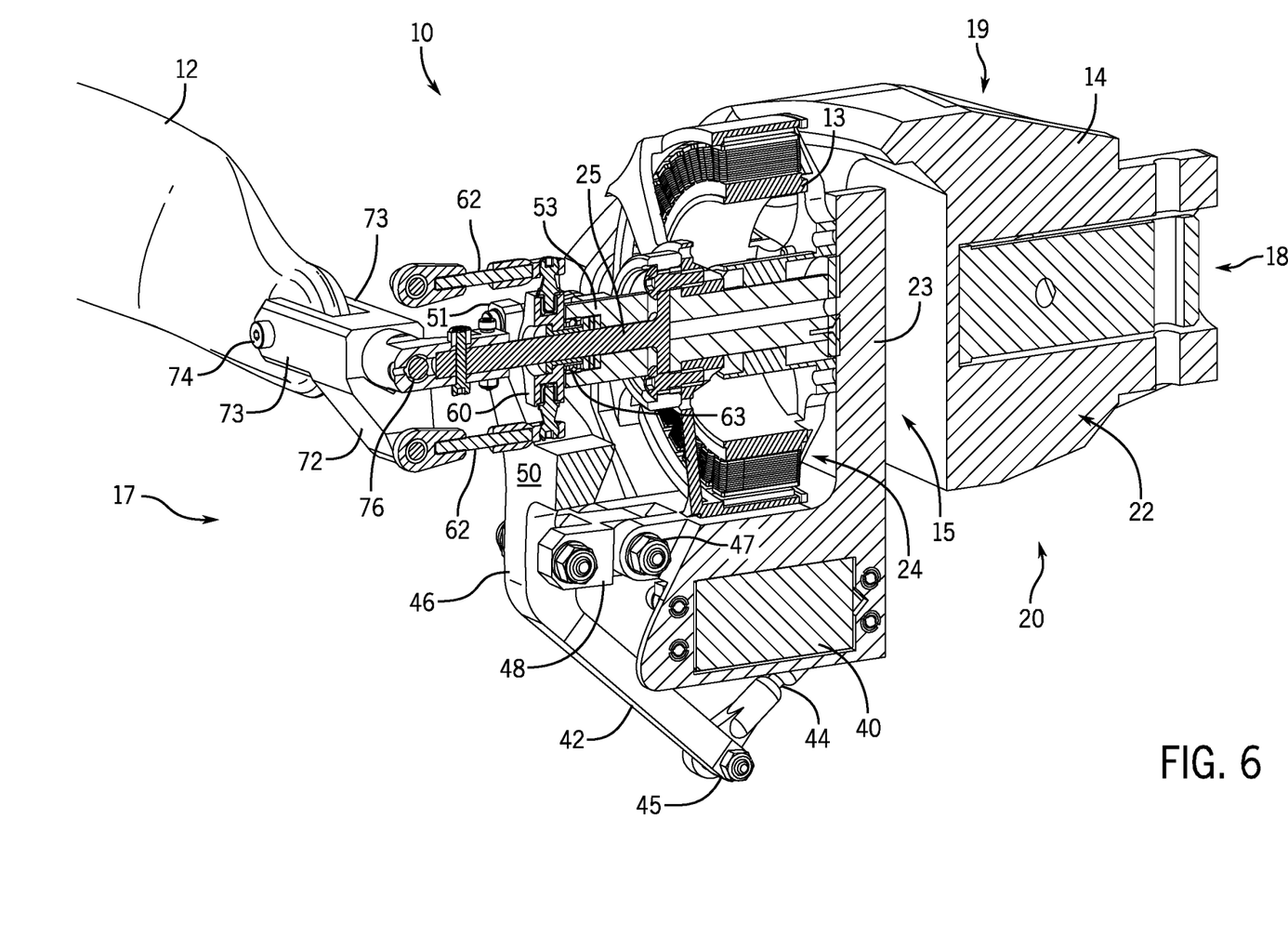
FIG. 6 is a sectional front, right, top perspective view of the apparatus.

FIG. 6 is a sectional front, right, top perspective view of apparatus 10. FIG. 6 further shows a feathering shaft 76 in the rotor head hub 70.

For forward flight, a signal from the rotor tilt adjustment actuator 30 causes the actuator drive arm 43 to rotate clockwise. The connecting rod 34 connected to the actuator drive arm 43 then pulls the motor mount 23 downward, so that the drive shaft 25 is in a horizontal orientation for forward flight. For vertical flight or hovering or landing, a signal from the rotor tilt adjustment actuator 30 causes the actuator drive arm 43 to rotate counterclockwise. The connecting rod 34 pushes the motor mount 23 upward so that the drive shaft 25 is in a vertical position. In this manner, the rotor tilt adjustment actuator 30 can position the drive shaft 25 at any angle from horizontal to vertical.

For adjusting the pitch of the rotors 11 and 12, a signal from the rotor pitch adjustment actuator 40 to rotate the rotors 11 and 12 around the longitudinal axis 49 (see FIG. 2) of the rotors 11 and 12 in a first direction causes the actuator drive arm 43 to rotate clockwise. The actuator drive arm 43 then pulls the connecting rod 44 downward which then pulls the first end and 45 of the rotor pitch adjustment fork 42 downward and the second opposite end 46 extends upward linearly. As the second opposite end 46 extends upward, the upper swash plate 60 is pushed upward along the drive shaft 25 of the motor 13 and the rotors 11 and 12 are rotated around their longitudinal axis 49 thereby adjusting pitch of the rotors 11 and 12 in a first direction.

A signal from the rotor pitch adjustment actuator 40 to rotate the rotors 11 and 12 around the longitudinal axis 49 of the rotors in a second opposite direction causes the actuator drive arm 43 to rotate counterclockwise. The actuator drive arm 43 then pushes the first end 45 of the rotor pitch adjustment fork 42 upward and the second opposite end 46 extends downward linearly. As the second opposite end 46 extends downward, the upper swash plate is pulled downward along the drive shaft 25 and the rotors are rotated around their longitudinal axes 49 thereby adjusting pitch of the rotors in a second opposite direction.

The tilt of the motor and rotors and the pitch of the rotors can be changed variably, simultaneously, and continuously as needed to maintain desired flight characteristics.

The foregoing description illustrates and describes the disclosure. Additionally, the disclosure shows and describes only the preferred embodiments but, as mentioned above, it is to be understood that the preferred embodiments are capable of being formed in various other combinations, modifications, and environments and are capable of changes or modifications within the scope of the invention concepts as expressed herein, commensurate with the above teachings and/or the skill or knowledge of the relevant art.

The embodiments described herein above are further intended to explain the best modes known by applicant and to enable others skilled in the art to utilize the disclosure in such, or other, embodiments and with the various modifications required by the particular applications or uses thereof. Accordingly, the description is not intended to limit the invention to the form disclosed herein. Also, it is intended that the appended claims be construed to include alternative embodiments. It will be further understood that various changes in the details, materials, and arrangements of the parts which have been described and illustrated above in order to explain the nature of this invention may be made by those skilled in the art without departing from the principle and scope of the invention as recited in the following claims.

What is claimed is:

1. An apparatus providing continuous tilt and variable pitch for rotors on an aircraft, comprising:
   a) a motor having a drive shaft with rotors at a free end of the drive shaft;
   b) a rotor tilt adjustment servomotor, in combination with a servo drive arm and connecting rod, attached to a housing on a side of the housing and to a first pivot point on a side of a motor mount in the center of the motor mount, whereby the rotor tilt adjustment servomotor is constructed to push and pull the motor mount relative to the pivot point, thereby causing the motor mount to rotate about the pivot point; and
   c) a rotor pitch adjustment servomotor, in combination with a servo drive arm and connecting rod, attached to a bottom end of the motor mount and to a rotor pitch adjustment fork attached rotatably to a second pivot point on the motor mount, whereby the rotor pitch adjustment servomotor adjusts the pitch of the rotors by rotating the rotor pitch adjustment fork on the second pivot point, wherein the first pivot point and the second pivot point are on the same side of the drive shaft.

2. The apparatus of claim 1, further comprising:
   a) the rotor pitch adjustment fork having a first end and a second end opposite the first end, the second end having a fork member extending therefrom, the fork member comprising a pair of tines, the pair of tines attached to a lower swashplate, wherein the lower swash plate is attached slidably to the drive shaft and wherein the second end of the rotor pitch adjustment fork is attached to the second pivot point; and
   b) an upper swash plate attached slidably to the drive shaft and attached rotatably to the lower swash plate.

3. The apparatus of claim 2, further comprising:
   a) the lower swash plate having a ball bearing positioned around the drive shaft, an outer wall of the ball bearing attached to an inner wall of an interior of the lower swash plate;
   b) the lower swash plate having a thrust bearing positioned around the drive shaft behind the ball bearing; and
   c) a sleeve bushing passing through the ball bearing and attached to an inner wall of the ball bearing, the sleeve bushing positioned rotatably around the drive shaft, and the sleeve bushing attached to the upper swash plate.

4. The apparatus of claim 3, wherein a front end of the sleeve bushing has a flange which is connected to a shelf in an interior of the upper swash plate.

5. The apparatus of claim 1, wherein the second pivot point is a dual pivot linkage.

6. The apparatus of claim 1, wherein each rotor is attached to a rotor holder, wherein each rotor holder is attached rotatably to a rotor head hub, and wherein the rotor head hub is attached to the free end of the drive shaft.

7. An apparatus providing continuous tilt and variable pitch for rotors on an aircraft, comprising:
   a) a housing with an interior and a motor mount with an interior, the motor mount attached rotatably to the housing in the interior of the housing and a motor attached to the motor mount in the interior of the motor mount;
   b) the motor having a drive shaft with rotors at a free end of the drive shaft;
   c) a rotor tilt adjustment servomotor, in combination with a servo drive arm and connecting rod, attached to the housing on a side of the housing and attached with motor tilt linkage to a first pivot point on a side of the motor mount in the center of the motor mount, whereby the rotor tilt adjustment servomotor and the motor tilt linkage are constructed to push and pull the motor mount relative to the pivot point, thereby causing the motor mount to rotate about the pivot point; and
   d) a rotor pitch adjustment servomotor, in combination with a servo drive arm and connecting rod, attached to the bottom end of the motor mount and attached with a rotor pitch linkage to a first end of a rotor pitch adjustment fork, the rotor pitch adjustment fork attached rotatably at a second end opposite the first end to a second pivot point on the motor mount, whereby the rotor pitch adjustment servomotor adjusts the pitch of the rotors by rotating the rotor pitch adjustment fork on the second pivot point, wherein the first pivot point and the second pivot point are on the same side of the drive shaft.

8. The apparatus of claim 7, further comprising:
a) a fork member at the opposite end of the rotor pitch adjustment fork, the fork member comprising a pair of spaced-apart tines, a first connecting member attached to each tine, each first connecting member extending to the motor mount and attaching to a lower swash plate, wherein the lower swash plate is attached slidably to the drive shaft with the drive shaft passing through an interior of the lower swash plate and wherein the second end of the rotor pitch adjustment fork is attached to the second pivot point; and
b) an upper swash plate attached rotatably to the lower swash plate with the drive shaft passing through an interior of the upper swash plate, a second connecting member attached to each side of the upper swash plate, each second connecting member extending to a respective rotor holder.

9. The apparatus of claim 8, further comprising:
a) the lower swash plate having a ball bearing positioned around the drive shaft, an outer wall of the ball bearing attached to an inner wall of the interior of the lower swash plate near a front end of the lower swash plate;
b) the lower swash plate having a thrust bearing positioned around the drive shaft behind the ball bearing and spaced apart from an interior wall of the lower swash plate; and
c) a sleeve bushing passing through the ball bearing and attached to an inner wall of the ball bearing, the sleeve bushing positioned rotatably around the drive shaft, and the sleeve bushing attached to the upper swash plate, thereby connecting the upper swash plate rotatably to the lower swashplate.

10. The apparatus of claim 9, wherein a front end of the sleeve bushing has a flange which is connected to a shelf in the interior of the upper swash plate.

11. The apparatus of claim 10, wherein the second pivot point is a dual pivot linkage.

12. The apparatus of claim 10, wherein each rotor is attached to a rotor holder, each rotor holder is attached rotatably to a rotor head hub, and the rotor head hub is attached to the free end of the drive shaft.

13. The apparatus of claim 9, wherein the second pivot point is a dual pivot linkage.

14. The apparatus of claim 9 wherein each rotor is attached to a rotor holder, each rotor holder is attached rotatably to a rotor head hub, and the rotor head hub is attached to the free end of the drive shaft.

15. The apparatus of claim 8, wherein the second pivot point is a dual pivot linkage.

16. The apparatus of claim 8, wherein each rotor is attached to a rotor holder, each rotor holder is attached rotatably to a rotor head hub, and the rotor head hub is attached to the free end of the drive shaft.

17. The apparatus of claim 7, wherein the second pivot point is a dual pivot linkage.

18. The apparatus of claim 7, wherein each rotor is attached to a rotor holder, wherein each rotor holder is attached rotatably to a rotor head hub, and wherein the rotor head hub is attached to the free end of the drive shaft.

19. An apparatus providing continuous tilt and variable pitch for rotors on an aircraft, comprising:

a) a housing with an interior and a motor mount with an interior, the motor mount attached rotatably to the housing in the interior of the housing and a motor attached to the motor mount in the interior of the motor mount;
b) the motor having a drive shaft with rotors at a free end of the drive shaft, wherein each rotor is attached to a rotor holder, each rotor holder is attached rotatably to a rotor head hub, and the rotor head hub is attached to the free end of the drive shaft;
c) a rotor tilt adjustment servomotor, in combination with a servo drive arm and connecting rod, attached to the housing on a side of the housing and attached with motor tilt linkage to a first pivot point on a side of the motor mount in a center of the motor mount, whereby the rotor tilt adjustment servomotor and the motor tilt linkage are constructed to push and pull the motor mount relative to the pivot point, thereby causing the motor mount to rotate about the pivot point;
d) a rotor pitch adjustment servomotor, in combination with a servo drive arm and connecting rod, attached to a bottom of the motor mount and attached with a rotor pitch linkage to a first end of a rotor pitch adjustment fork, the rotor pitch adjustment fork attached rotatably at a second end opposite the first end to a second pivot point on the motor mount, wherein the second pivot point is a dual pivot linkage and whereby the rotor pitch adjustment servomotor adjusts the pitch of the rotors by rotating the rotor pitch adjustment fork on the second pivot point, and wherein the first pivot point and the second pivot point are on the same side of the drive shaft;
e) a fork member at the second end of the rotor pitch adjustment fork, the fork member comprising a pair of spaced-apart tines, a first connecting member attached to each tine, each first connecting member extends to the motor mount and attaches to a lower swashplate, wherein the lower swash plate is attached slidably to the drive shaft with the drive shaft passing through an interior of the lower swash plate;
f) an upper swash plate attached rotatably to the lower swash plate with the drive shaft passing through an interior of the upper swash plate, a second connecting member attached to each side of the upper swash plate, each second connecting member extends to a respective rotor holder;
g) the lower swash plate having a ball bearing positioned around the drive shaft, an outer wall of the ball bearing attached to an inner wall of the interior of the lower swash plate near a front end of the lower swash plate;
h) the lower swash plate having a thrust bearing positioned around the drive shaft behind the ball bearing and spaced apart from an interior wall of the lower swash plate; and
i) a sleeve bushing passing through the ball bearing and attached to an inner wall of the ball bearing, the sleeve bushing positioned rotatably around the drive shaft, and the sleeve bushing attached to the upper swash plate, thereby connecting the upper swash plate rotatably to the lower swashplate, wherein a front end of the sleeve bushing has a flange which is connected to a shelf in the interior of the upper swash plate.

* * * * *